United States Patent [19]

Box

[11] Patent Number: 4,473,309
[45] Date of Patent: Sep. 25, 1984

[54] BEARING ASSEMBLY WITH THERMAL COMPENSATION

[75] Inventor: Richard H. Box, Bristol, England
[73] Assignee: Rolls-Royce Limited, London, England
[21] Appl. No.: 443,610
[22] Filed: Nov. 22, 1982

[30] Foreign Application Priority Data
Nov. 28, 1981 [GB] United Kingdom ............... 8136011

[51] Int. Cl.³ ............................................. F16C 35/067
[52] U.S. Cl. ............................ 384/278; 308/DIG. 14
[58] Field of Search ............... 308/189 R, 184 R, 178, 308/216, 236, DIG. 14, 207 A, 207 R, 235, DIG. 15; 384/278

[56] References Cited

U.S. PATENT DOCUMENTS

| | | | |
|---|---|---|---|
| 2,345,952 | 4/1944 | Smith | 308/236 X |
| 2,700,581 | 1/1955 | Migny | 308/236 X |
| 3,311,431 | 3/1967 | Hilliard | 308/DIG. 14 X |
| 4,226,485 | 10/1980 | Pruvot | 308/207 R |
| 4,286,830 | 9/1981 | Salter, Jr. | 308/207 R |

FOREIGN PATENT DOCUMENTS 2095769 10/1982 United Kingdom .

*Primary Examiner*—Stuart S. Levy
*Assistant Examiner*—David Werner
*Attorney, Agent, or Firm*—Parkhurst & Oliff

[57] ABSTRACT

Bearing assembly intended for operation in a given temperature range has a radially outer bearing member 16 made of steel and supported in a housing 20 made of a material, e.g. magnesium whose coefficient of thermal expansion is substantially higher than steel. The member 16 has radially inwardly facing surface 17 adapted to engage a radially outwardly facing surface 22 of the housing. In use, when the temperature of the assembly rises the surface 22 of the housing moves toward the surface 17 of the member 16 so that engagement between the surfaces 17,22 is enhanced or an initial gap 23 between the surfaces 17,22 is closed.

15 Claims, 1 Drawing Figure

U.S. Patent          Sep. 25, 1984          4,473,309
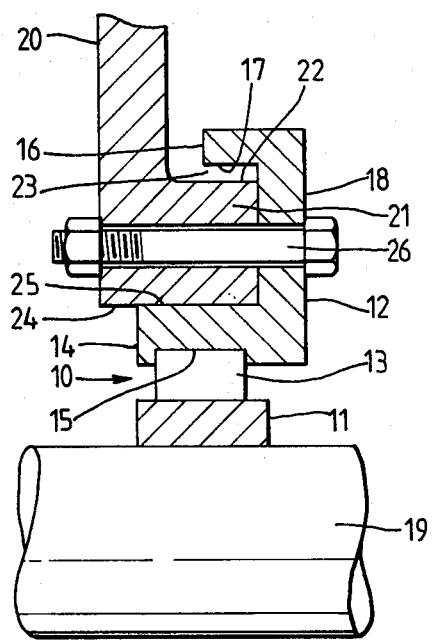

BEARING ASSEMBLY WITH THERMAL COMPENSATION

This invention relates to a bearing assembly intended for operation in a given temperature range.

It is sometimes required to support a radial bearing having components made e.g. of steel, in a housing made of a light alloy, e.g. magnesium. While such an assembly benefits from the light weight of the alloy, e.g. in the context of an aircraft engine, there is the difficulty that due to the coefficient of thermal expansion of the alloy being higher than that of steel, the housing tends to expand away from the outer bearing race during a rise in the operating temperature of the assembly. This can result in a clearance between the outer race and the housing and consequent loss of positive location of the bearing. It is an object of this invention to reduce and overcome this difficulty when the temperature of the assembly rises.

The scope of the invention is specified in the claims hereto. In use of the invention, on radial expansion of the housing, the radially outwardly facing surface of the housing moves toward the radially inwardly facing surface of the radially outer bearing member so that engagement between the surfaces is enhanced. Insofar as it is desirable to avoid undue pressure between the housing and the outer bearing member during a said expansion, the housing and the outer bearing member are so dimensioned that at the lower end of the temperature range there exists between them a clearance which is taken up on reaching the upper end of said range.

An example of a bearing assembly according to the invention will now be described with reference to the accompanying drawing which is a sectional elevation of the assembly.

A radial roller bearing 10 has an annular inner bearing member 11, an annular outer bearing member 12 and bearing rollers 13 arranged between the members 11, 12. The member 12 is of channel cross-section wherein one side, 14, of the channel section defines a race 15 for the rollers 13 and the other side, 16, of the channel section defines a cylindrical radially inwardly facing mounting surface 17. The sides 14,16 are connected by a base portion 18. The bearing 10, which supports a shaft 19, is itself supported in a housing 20 having a portion 21 situated between the sides 14,16 and defining a cylindrical radially outwardly facing mounting surface 22 confronting the mounting surface 17 of the bearing member 12 across a small clearance 23.

The portion 21 also defines a cylindrical radially inwardly facing surface 24 confronting, and engaging, a cylindrical radially outwardly facing surface 25 of the side 14.

The bearing member 12 is made of steel while the housing 20 is made of magnesium whose coefficient of thermal expansion is greater than that of steel by a factor of about 2.2.

The assembly comprising of the bearing 10 and housing 20 is intended for operation in a temperature range over which the difference in said coefficient of the two materials is signficant as regards the location of the surface 17 on the surface 22. The drawing shows the assembly at the lower end of said temperature range, the bearing 10 being supported in the housing 20 at the surfaces 24,25. When the temperature of the assembly rises the relatively higher coefficient of magnesium causes the housing 20 to expand at a higher rate than the bearing member 12 so that the clearance 23 diminishes. The surfaces 17,22 are so dimensioned that when the upper end of the temperature range is reached the surfaces 17, 22 are in firm engagement. In this condition, the surfaces 24,25 will have separated and a clearance corresponding to the clearance 23 will have occurred between them.

It will be appreciated that, if the temperature range is not very large, it may be sufficient for the clearance 23 to be so small that there is in fact light contact between the surfaces 17,22, the light contact changing to firm contact as the temperature rises. In such a case there is no need for support by the surfaces 24,25 and a substantial clearance can exist between them.

The member 12 is located axially on the housing 20 by four circumferentially spaced screws 26 extending through aligned holes in the base portions 18 and housing portion 21. The screws 26 provide a firm connection between the member 12 and the portion 21 but the connection is such that the member 12 and the portion 21 can slide radially relative to one another under the thermal forces acting on them.

I claim:

1. A thermally responsive bearing assembly comprising:
   a housing having an annular first surface facing radially outwardly and an annular second surface facing radially inwardly;
   a radial bearing having a radially outer annular bearing member mounted in said housing, said outer annular bearing member having an annular first surface facing radially inwardly and an annular second surface facing radially outwardly, said radially outer annular bearing member having a thermal expansion coefficient which is less than a thermal expansion coefficient of said housing, such that when the bearing assembly is at a first predetermined temperature, said outer annular bearing member is supported in said housing by a contacting engagement between said annular second surface of said annular bearing member and said annular second surface of said housing and when the bearing assembly is at a second predetermined temperature, said outer annular bearing member is supported in said housing by a contacting engagement between said annular first surface of said housing and said annular first surface of said outer annular bearing member.

2. The bearing assembly of claim 1, wherein said first predetermined temperature is lower than said second predetermined temperature and said annular first surface of said housing and said annular first surface of said outer annular bearing member lightly contact each other when the bearing assembly is at said first predetermined temperature.

3. The bearing assembly of claim 2, wherein said annular second surface of said housing and said annular second surface of said outer annular bearing member have a clearance therebetween when the bearing assembly is at said second predetermined temperature.

4. The bearing assembly of claim 1, wherein said first predetermined temperature is lower than said second predetermined temperature and a radial clearance exists between said annular first surface of said housing and said annular first surface of said outer annular bearing member when the bearing assembly is at said first predetermined temperature.

5. The bearing assembly of claim 4, wherein a second radial clearance exists between said annular second surface of said housing and said annular second surface of said outer annular bearing member when the bearing assembly is at said second predetermined temperature.

6. The bearing assembly of claim 1, wherein said annular second surface of said outer annular bearing member is located radially inwardly of said annular first surface of said outer annular bearing member and an annular portion of said housing, having said annular first surface and said annular second surface located thereon, is situated between said annular first and second surfaces of said outer annular bearing member.

7. The bearing assembly of claim 1, wherein said housing and said outer annular bearing member are held in axial engagement by a plurality of axially located bolt members.

8. The bearing assembly of claim 7, wherein said bolt members permit a limited relative radial displacement between said housing and said outer annular bearing member.

9. A thermally responsive bearing assembly comprising:
a housing having a radially inwardly located annular portion with an annular first surface facing radially outwardly and an annular second surface facing radially inwardly;
a radial bearing having a radially outer annular bearing member mounted in said housing, said outer annular bearing member having an annular first surface facing radially inwardly and located radially outward from said annular first surface of said annular portion of said housing and an annular second surface facing radially outwardly and located radially inward from said annular second surface of said annular portion of said housing, said radially outer annular bearing member having a thermal expansion coefficient which is less than a thermal expansion coefficient of said housing, such that when the bearing assembly is at a first predetermined temperature, said outer annular bearing member is supported in said housing by a contacting engagement between said annular second surface of said annular portion of said housing and said annular second surface of said annular bearing member and when the bearing assembly is at a second predetermined temperature, said outer annular bearing member is supported in said housing by a contacting engagement between said annular first surface of said housing and said annular first surface of said outer annular bearing member.

10. The bearing assembly of claim 9, wherein said first predetermined temperature is lower than said second predetermined temperature and said annular first surface of said annular portion of said housing and said annular first surface of said outer annular bearing member lightly contact each other when the bearing assembly is at said first predetermined temperature.

11. The bearing assembly of claim 10, wherein said annular second surface of said annular portion of said housing and said annular second surface of said outer annular bearing member have a clearance therebetween when the bearing assembly is at said second predetermined temperature.

12. The bearing assembly of claim 9, wherein said first predetermined temperature is lower than said second predetermined temperature and a radial clearance exists between said annular first surface of said annular portion of said housing and said annular first surface of said outer annular bearing member when the bearing assembly is at said first predetermined temperature.

13. The bearing assembly of claim 12, wherein a radial clearance exists between said annular second surface of said annular portion of said housing and said annular second surface of said outer annular bearing member when the bearing assembly is at said second predetermined temperature.

14. The bearing assembly of claim 9, wherein said annular portion of said housing and said outer annular bearing member are held in axial engagement by a plurality of axially located bolt members.

15. The bearing assembly of claim 14, wherein said bolt members permit a limited relative radial displacement between said annular portion of said housing and said outer annular bearing member.

* * * * *